US008047801B2

(12) United States Patent  
Fang et al.

(10) Patent No.: US 8,047,801 B2
(45) Date of Patent: Nov. 1, 2011

(54) WIND TURBINE BLADES WITH AERODYNAMIC VORTEX ELEMENTS

(75) Inventors: Biao Fang, Clifton Park, NY (US); Stefan Herr, Greenville, SC (US); Xiaoyue Liu, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/821,725

(22) Filed: Jun. 23, 2010

(65) Prior Publication Data

US 2011/0142673 A1 Jun. 16, 2011

(51) Int. Cl.
  *F03D 1/06* (2006.01)
(52) U.S. Cl. .................... 416/235; 416/236 R
(58) Field of Classification Search .............. 416/235, 416/236 R, 237, 223 R, 241 R
  See application file for complete search history.

(56) References Cited

U.S. PATENT DOCUMENTS

| | | | | |
|---|---|---|---|---|
| 3,578,264 A * | 5/1971 | Kuethe | ...................... | 244/200.1 |
| 4,699,340 A * | 10/1987 | Rethorst | .................... | 244/200.1 |
| 5,058,837 A * | 10/1991 | Wheeler | .................... | 244/200.1 |
| 5,734,990 A * | 4/1998 | Waring | ................ | 2/69 |
| 6,872,048 B2 * | 3/2005 | Uselton et al. | ................ | 415/119 |
| 6,910,867 B2 * | 6/2005 | Corten | ..................... | 416/223 R |
| 7,585,157 B2 | 9/2009 | Quell et al. | | |
| 2007/0110585 A1 * | 5/2007 | Bonnet | ........................ | 416/235 |
| 2007/0284848 A1 * | 12/2007 | Brownlie | ................... | 280/288.1 |
| 2008/0175711 A1 | 7/2008 | Godsk | | |
| 2009/0068018 A1 | 3/2009 | Corten | | |

FOREIGN PATENT DOCUMENTS

| | | |
|---|---|---|
| EP | 0947693 | 10/1999 |
| EP | 1674723 | 6/2006 |
| EP | 1896323 | 3/2008 |
| EP | 1944505 | 7/2008 |
| EP | 2098721 | 9/2009 |
| JP | 4029063 | 1/1992 |
| WO | WO 00/15961 | 3/2000 |
| WO | WO 01/16482 | 3/2001 |
| WO | WO 2007/140771 | 12/2007 |
| WO | WO 2008/113349 | 9/2008 |
| WO | WO 2008/113350 | 9/2008 |

OTHER PUBLICATIONS

English Abstract of EP 0947693.
English Abstract of JP 4029063.
Samsung Wind Turbine 2.5MW Brochure, www.shi.Samsung.co.kr.

* cited by examiner

*Primary Examiner* — Justine Yu
*Assistant Examiner* — Liam McDowell
(74) *Attorney, Agent, or Firm* — Dority & Manning, P.A.

(57) ABSTRACT

A wind turbine blade had a suction side surface and a pressure side surface. A plurality of vortex elements are formed on at least one of the suction side or the pressure side surfaces. The vortex elements have an upwardly inclined wind face and a downwardly inclined slip face, with the wind face and slip face meeting at a generally open-ended U-shaped ridge that defines side horns. The side horns decrease in height from a forward most portion of the ridge to the suction side surface or pressure side surface.

15 Claims, 4 Drawing Sheets

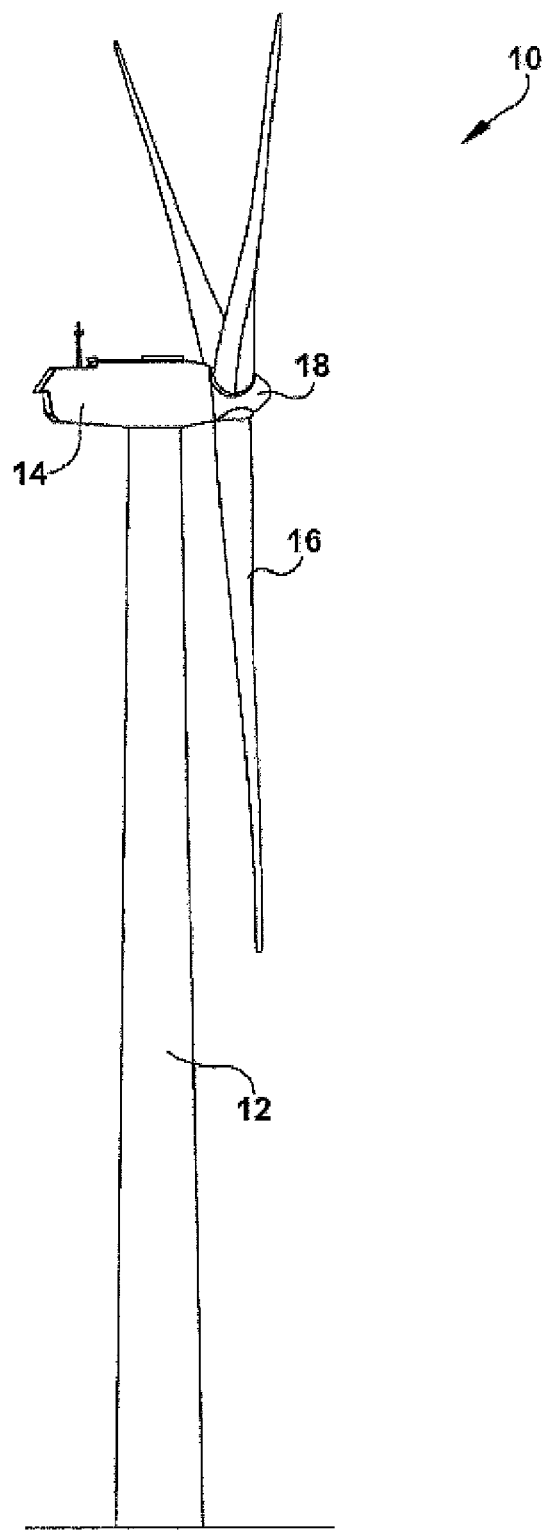
*Fig. -1-*
PRIOR ART

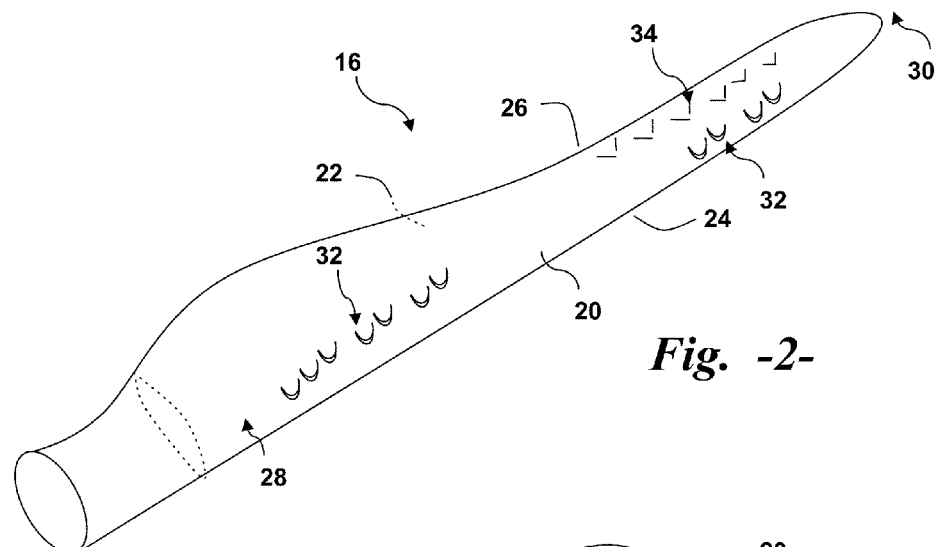
*Fig. -2-*
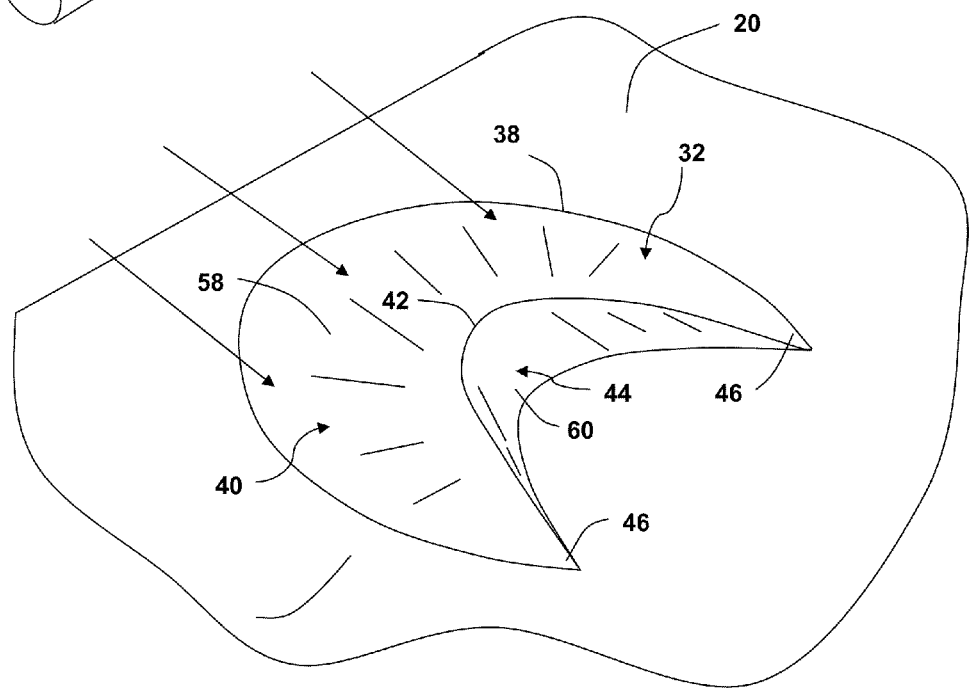
*Fig. -3-*

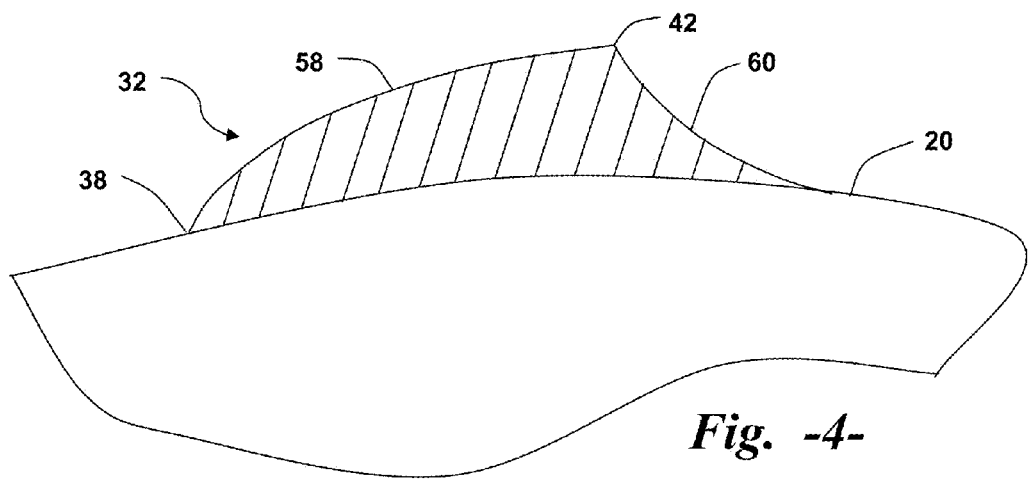
*Fig. -4-*
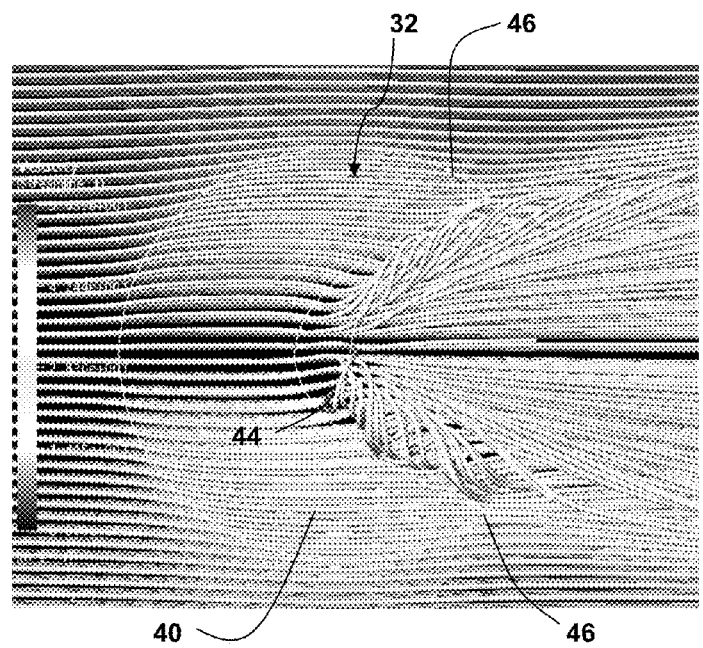
*Fig. -5-*

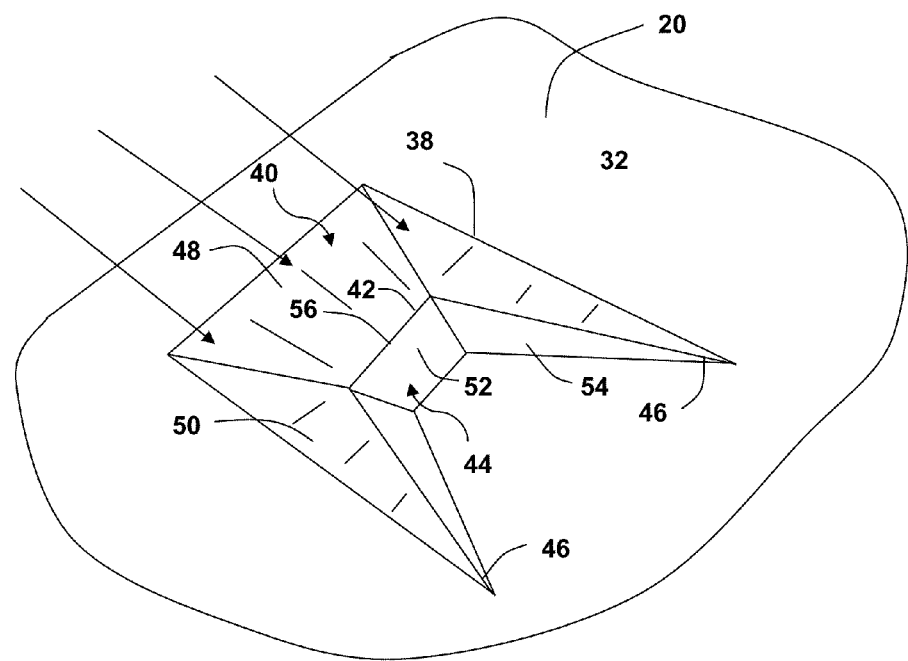
Fig. -6-
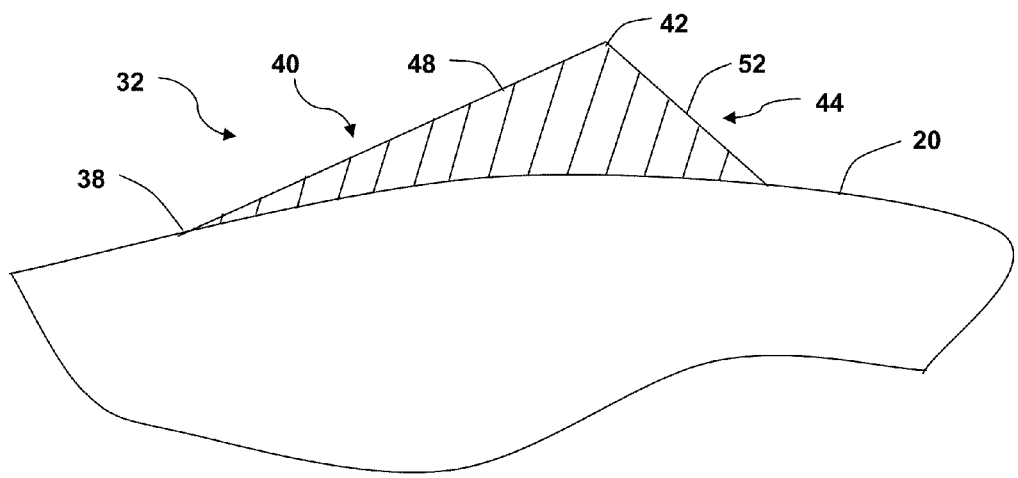
Fig. -7-

WIND TURBINE BLADES WITH AERODYNAMIC VORTEX ELEMENTS

FIELD OF THE INVENTION

The present invention relates generally to the field of wind turbines, and more particularly to turbine blades having an aerodynamic vortex element on the flow surfaces thereof.

BACKGROUND OF THE INVENTION

Turbine blades are the primary elements of wind turbines for converting wind energy into electrical energy. The working principle of the blades resembles that of an airplane wing. The blades have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

The lift force is generated when the flow from the leading edge to the trailing edge creates a pressure difference between the top and bottom surfaces of the blade. Ideally, the flow is attached to the top surface from the leading edge to the trailing edge. However, when the angle of attack of the flow exceeds a certain critical angle, the flow does not reach the trailing edge, but leaves the surface at a flow separation line. Beyond this line, the flow direction is generally reversed, i.e. it flows from the trailing edge backward to the separation line. A blade section extracts much less energy from the flow when it separates.

Flow separation depends on a number of factors, such as incoming air flow characteristics (e.g. Reynolds number, wind speed, in-flow atmospheric turbulence) and characteristics of the blade (e.g. airfoil sections, blade chord and thickness, twist distribution, pitch angle, etc). The detached-flow region also leads to an increase in drag force, mainly due to a pressure difference between the upstream attached-flow region and the downstream detached-flow region. Flow separation tends to be more prevalent nearer the blade root due to the relatively great angle of attack of the blade flow surfaces in this region as compared to the blade tip.

Hence, in order to increase the energy conversion efficiency during normal operation of the wind turbine, it is desired to increase the lift force of the blades while decreasing the drag force. To this purpose, it is advantageous to increase the attached-flow region and to reduce the detached-flow region by moving flow separation nearer the trailing edge of the blade. This is particularly desirable nearer to the blade root in order to increase the overall lift generated by the blade.

It is know in the art to change the aerodynamic characteristics of wind turbine blades by adding dimples, protrusions, or other structures on the surface of the blade. These structures are often referred to as "vortex generators" and serve to create local regions of turbulent airflow over the surface of the blade as a means to prolong flow separation and thus optimize aerodynamic airflow around the blade contour. Conventional vortex generators are typically sheet metal and defined as "fins" or shaped structures on the suction side of the turbine blade. Conventional vortex generators are not, however, without drawbacks. Vortex generators create drag and tend to be noisy.

Accordingly, the industry would benefit from an aerodynamic vortex generator design that creates less resistance and noise and is thus particularly useful nearer to the blade root for increasing the lift generated by this region of the blade.

BRIEF DESCRIPTION OF THE INVENTION

Aspects and advantages of the invention will be set forth in part in the following description, or may be obvious from the description, or may be learned through practice of the invention.

In accordance with aspects of the invention, a wind turbine blade is provided having a suction side surface and a pressure side surface. A plurality of vortex elements are formed on either one or both of the surfaces. The vortex elements have an upwardly inclined wind face and a downwardly inclined slip face, with the wind face and slip face meeting at a generally open-ended U-shaped ridge that defines side horns. The side horns decrease in height from a forward most portion of the ridge to the suction side surface or pressure side surface.

In a particular embodiment of the vortex elements, the wind face and the slip face are formed by flat walls disposed at constant angles. For example, the wind face may have a flat front wall and opposite flat side walls, and the slip face may similarly have a flat front wall and opposite flat side walls.

In another unique embodiment, the vortex elements have a semi-hemispherical crescent shape with a convex wind face and a concave slip face, with the U-shaped ridge comprising a continuously curved arc shape.

The vortex elements may be placed at any location on either or both of the blade's flow surfaces wherein it is desired to modify the aerodynamic characteristics of the surface. In a particular embodiment, the vortex elements are defined on the suction side surface at a chord length of between about 15% to about 65%. The vortex elements may be disposed closer to a root portion of the blade as compared to a tip portion, or closer to the tip portion as compared to the root portion.

The blade may incorporate the unique vortex elements with conventional vortex generators, such as wedge or fin-type vortex generators. For example, the vortex elements may be provided at a defined region of the blade while the vortex generators may be provided at a different region of the blade, or the vortex generators and vortex elements may be intermingled.

The invention also encompasses a wind turbine having one or more turbine blades configured with the unique vortex elements as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWING

A full and enabling disclosure of the present invention, including the best mode thereof, directed to one of ordinary skill in the art is set forth in the specification, which makes reference to the appended figures, in which:

FIG. 1 is a perspective view of a conventional wind turbine;

FIG. 2 is a perspective view of an embodiment of a wind turbine blade in accordance with aspects of the invention;

FIG. 3 is an enlarged perspective view of an exemplary vortex element in accordance with aspects of the invention;

FIG. 4 is a side cut-away view of a blade surface and vortex element;

FIG. 5 is computer generated image of air flow over a vortex element in accordance that particularly illustrates the induced downstream turbulent flow;

FIG. 6 is a perspective view of an alternative embodiment of a vortex element in accordance with aspects of the invention; and, FIG. 7 is a side cut-away view of the vortex element of FIG. 6.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

The present invention is described herein as it may relate to a component of a wind turbine blade. It should be appreciated, however, that the unique vortex element configuration in accordance with principles of the invention is not limited to use on wind turbine blades, but is applicable to any type of airfoil or flow surface that would benefit from the modified aerodynamic characteristics provided by the vortex elements. Examples of such surfaces include airplane wings, boat hulls, sails, and so forth.

FIG. 1 illustrates a wind turbine 10 of conventional construction. The wind turbine 10 includes a tower 12 with a nacelle 14 mounted thereon. A plurality of turbine blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

FIG. 2 depicts a wind turbine blade 16 incorporating aspects of the invention. The blades 16 include a suction side surface 20, a pressure side surface 22, a leading edge 24, and a trailing edge 26. The blades extend from a root portion 28 to a tip portion 30. A plurality of unique vortex elements 32 in accordance with aspects of the invention described in greater detail below are formed on either or both of the surfaces 22 and 24. In the embodiment illustrated in the figures, the vortex elements 32 are depicted on the suction side surface 20 for illustrative purposes only. It should be appreciated that the vortex elements 32 could also be provided on the pressure side surface 22.

The vortex elements 32 may be placed at any location on either or both of the blade's flow surfaces 20, 22 wherein it is desired to modify the aerodynamic characteristics of the surface. In a particular embodiment, the vortex elements 32 are defined on the suction side surface 20 at a chord length of between about 15% to about 65%, as depicted in FIG. 2. The vortex elements 32 may be disposed closer to a root portion 28 of the blade as compared to a tip portion 30, or closer to the tip portion 30 as compared to the root portion 28. It should be understood that the invention is not limited to any particular placement of the vortex elements 32 on either or both flow surfaces 20, 22 of the blade 16.

The vortex elements 32 may have different shape configurations within the scope and spirit of the invention. In general, the vortex elements 32 have an upwardly inclined wind face 40 and a downwardly inclined slip face 44, with the wind face 40 and slip face 44 meeting at a generally open-ended U-shaped ridge 42 that defines side horns 46. The side horns 46 decrease in height from a forward most portion 56 (FIG. 6) of the ridge 42 and slope down to the surface 20 on which the vortex elements 32 are formed.

The wind face 40 and slip face 44 may have various shapes and configurations. For example, in the embodiment of FIGS. 6 and 7, the wind face 40 and the slip face 44 are formed by generally flat inclined wall segments arranged to form a generally multi-sided base 38. The wind face 40 in this embodiment may include a flat front wall 48 and flat side walls 50. These walls are inclined at a relatively constant angle from the surface 20 to the ridge line 42. Likewise, the slip face 44 may include a flat front wall 52 and flat side walls 54 that are also inclined at a relatively constant angle up to the ridge line 42.

In a particularly unique embodiment illustrated in FIGS. 3 through 5, the vortex elements 32 have a generally semi-hemispherical crescent shape. For example, referring to FIG. 3, the vortex element 32 includes a generally semi-circular base 38 in the forward portion thereof that faces the direction of wind flow over the surface 20 (as indicated by the arrows in FIG. 3). The wind face 44 includes a generally convex surface wall 58 around the perimeter of the base 38 that extends from the surface 20 to the ridge line 42. The slip face 44 includes a generally concave wall 60 that extends from the surface 20 to the ridge line 42. The wind face 40 and slip face 44 merge at the crescent-shaped ridge line 42 that slopes down from the forward most portion of the ridge line 42 to the base 38 along the side horns 46. The base 38 along the slip face 44 also has a generally crescent shape such that the side horns 46 are defined as depicted in FIG. 3. FIG. 4 is a cut-away profile view of the vortex element 32 and particularly illustrates the convex wind face 40 and the concave slip face 44, as well as the ridge line 42.

The vortex elements 32 may be considered in certain embodiments as being modeled after naturally occurring crescent sand dunes, which act as vortex generators in nature. For example, FIG. 5 is a computer generated depiction of wind flow over a crescent vortex element 32. It is readily seen in FIG. 5 that air flow over the forward wind face 40 drops over the ridge and develops into trailing vortexes that are channeled along the horns 46 at the slip face 44. The unique crescent sand dune shape generates the aerodynamic vortexes with out significantly increasing drag, which is highly desirable for a vortex generator on a wind turbine flow surface.

The blade 16 may incorporate the unique vortex elements 32 with conventional vortex generators 34, such as fin or wedge-type vortex generators. For example, as depicted in FIG. 2, the vortex elements 32 may be provided at a defined region of the blade 16 while the vortex generators 34 may be provided at a different region of the blade 16. In a particular embodiment, the vortex elements 32 may be configured at the root portion 28 to provide increased lift with little additional drag (particularly desirable in low wind speed conditions), while conventional wedge or fin-type vortex generators 34 are provided at the higher speed regions of the blade closer to the blade tip 30. In an alternate embodiment, the vortex elements 32 may be located closer towards the tip portion 30 than the root portion 28.

It should also be understood that the present invention encompasses any configuration of wind turbine 10 (FIG. 1) that includes one or more blades 16 incorporating at least one of the unique vortex elements 32 as described herein.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. As mentioned, it should also be appreciated that the invention is applicable to any type of flow surface, and is not limited to a wind turbine blade. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A wind turbine blade, said blade comprising:
a suction side surface and a pressure side surface;
a plurality of vortex elements configured on at least one of said suction side or said pressure side surfaces; and,
said vortex elements having an upwardly inclined wind face and a downwardly inclined slip face, said wind face and said slip face meeting at a generally open-ended U-shaped ridge that defines side horns, said side horns decreasing in height from a forward most portion of said ridge to said suction side surface or said pressure side surface, said side horns further having a cross-sectional profile that decreases in width from said forward most portion of said ridge to said suction side surface or said pressure side surface, said vortex elements have a semi-hemispherical crescent shape with a convex wind face and a concave slip face, said U-shaped ridge comprising a continuously curved arc shape.

2. The wind turbine blade as in claim 1, wherein said wind face and said slip face are formed by flat walls disposed at constant angles.

3. The wind turbine blade as in claim 2, wherein said wind face comprises a flat front wall and flat side walls, and said slip face comprises a flat front wall and flat side walls.

4. The wind turbine blade as in claim 1, wherein said vortex elements are defined on said suction side surface at a chord length of between about 15% to about 65%.

5. The wind turbine blade as in claim 1, wherein said vortex elements are closer to a root portion of said blade as compared to a tip portion.

6. The wind turbine blade as in claim 1, wherein said vortex elements are closer to a tip portion of said blade as compared to a root portion.

7. The wind turbine blade as in claim 1, further comprising a plurality of vortex generators configured on at least one of said pressure side surface or said suction side surface in combination with said vortex elements.

8. The wind turbine blade as in claim 1, wherein said vortex elements are formed on said suction side surface and said pressure side surface.

9. A wind turbine, said wind turbine comprising a plurality of turbine blades, at least one of said turbine blades comprising:
a suction side surface and a pressure side surface;
a plurality of vortex elements configured on at least one of said suction side surface or said pressure side surface; and,
said vortex elements having an upwardly inclined wind face and a downwardly inclined slip face, said wind face and said slip face meeting at a generally open-ended U-shaped ridge that defines side horns, said side horns decreasing in height from a forward most portion of said ridge to said suction side surface or said pressure side surface, said side horns having a cross-sectional profile that decreases in width from said forward most portion of said ridge to said suction side surface or said pressure side surface, said vortex elements have a semi-hemispherical crescent shape with a convex wind face and a concave slip face, said U-shaped ridge comprising a continuously curved arc shape.

10. The wind turbine as in claim 9, wherein said wind face and said slip face are formed by flat walls disposed at constant angles.

11. The wind turbine as in claim 9, wherein said vortex elements are defined on said suction side surface at a chord length of between about 15% to about 65%.

12. The wind turbine as in claim 9, wherein said vortex elements are closer to a root portion of said blade as compared to a tip portion.

13. The wind turbine as in claim 9, wherein said vortex elements are closer to a tip portion of said blade as compared to a root portion.

14. The wind turbine as in claim 9, further comprising a plurality of vortex generators configured on at least one of said pressure side surface or said suction side surface in combination with said vortex elements.

15. The wind turbine as in claim 9, wherein said vortex elements are formed on said suction side surface and said pressure side surface.

* * * * *